United States Patent [19]

Aihara et al.

[11] Patent Number: 4,734,454

[45] Date of Patent: Mar. 29, 1988

[54] AQUEOUS COATING COMPOSITION

[75] Inventors: Tetsuo Aihara, Isehara; Yasuharu Nakayama, Fujisawa, both of Japan

[73] Assignee: Kansai Paint Co., Ltd., Hyogo, Japan

[21] Appl. No.: 836,510

[22] Filed: Mar. 5, 1986

[30] Foreign Application Priority Data

Mar. 8, 1985 [JP] Japan ................................. 60-46147

[51] Int. Cl.$^4$ .................... C08F 220/36; C08F 220/68
[52] U.S. Cl. .................................. 524/555; 106/243; 260/404.5; 526/301
[58] Field of Search ................ 524/555, 813; 526/301; 260/404.5 I; 106/243

[56] References Cited

U.S. PATENT DOCUMENTS

| 2,609,349 | 9/1952 | Cass | 526/301 |
|---|---|---|---|
| 3,297,745 | 1/1967 | Fekete | 526/301 |
| 3,345,388 | 10/1967 | Milligan | 260/404.5 |
| 3,856,830 | 12/1974 | Kuehn | 260/404.5 |
| 4,328,325 | 5/1982 | Marquardt | 526/301 |
| 4,514,552 | 4/1985 | Shay | 526/301 |
| 4,600,761 | 7/1986 | Ruffner | 526/301 |
| 4,609,706 | 9/1986 | Bode | 526/301 |

FOREIGN PATENT DOCUMENTS 56-36503  4/1981  Japan .................................. 526/301

Primary Examiner—C. Warren Ivy
Attorney, Agent, or Firm—Wenderoth, Lind & Ponack

[57] ABSTRACT

An aqueous coating composition which is characterized in that it contains an aqueous solution or dispersion of a resin formed through copolymerization of a monomeric mixture composed of
(A) an ethylenically unsaturated monomer containing at least one urethane linkage and at least two non-conjugated double bonds per molecule 5–98 parts by weight,
(B) an ethylenically unsaturated carboxylic 0.5–20 parts by weight, and
(C) an ethylenically unsaturated monomer or monomers other than (A) and (B) 0–94.5 parts by weight, the total sum of (A), (B) and (C) components being 100 parts by weight.

25 Claims, No Drawings

AQUEOUS COATING COMPOSITION

This invention relates to water-soluble or water-dispersible coating compositions which are particularly useful as oxidation and cross-linking hardenable coating compositions. More specifically, the invention relates to aqueous coating compositions which can be easily synthesized and have especially improved blocking resistance during the initial drying period.

Acrylic oxidation cross-linking type aqueous resins excelling in storage stability, water resistance, alkali resistance and weatherability, etc. known in the past include copolymer resins obtained through copolymerization of a fatty acid-modified unsaturated monomer, which is formed by an addition reaction of a glycidyl group-containing unsaturated monomer with drying oil fatty acid and/or semidrying oil fatty acid, with an ethylenically unsaturated carboxylic acid (U.S. Pat. No. 3,988,273); and copolymer resins disclosed in U.S. Pat. No. 4,312,797 as those excelling particularly in water resistance, which are obtained through copolymerization of unsaturated monomers formed through the reaction of hydroxyl group-containing unsaturated monomer with drying oil fatty acid and/or semidrying oil fatty acid. The addition reaction of glycidyl group-containing unsaturated monomer with fatty acid, however, requires relatively high temperatures such as about 150° C. and above, which necessitates the use of a large amount of polymerization inhibitor in order to prevent polymerization of unsaturated double bonds. For this reason the resultant modified monomer exhibits poor copolymerizability with other unsaturated monomers, and the product copolymers have such a defect that the coating films obtained therefrom show poor curability. Furthermore, the glycidyl group-containing unsaturated monomers are economically disadvantageously expensive.

Again under the current circumstances where the finished products are successively piled up as run through high-speed industrial production lines, the coating films of the water-based coating compositions composed of aforesaid copolymer resins cause scratches and peeling-off, due to their poor blocking resistance.

In order to improve this defect, the present inventors attempted to improve blocking resistance of the copolymer resins by introducing into the aforesaid unsaturated monomer formed by addition reaction of glycidyl group-containing unsaturated monomer with fatty acid, long-chain alkyl groups at the sites of secondary hydroxyl groups, through urethane linkages [Laid-open (Kokai) Japanese Patent Application, Publication No. 51509/1985]. However, because the urethane linkages in the copolymer resin could not fully exhibit their hydrogen-bonding ability due to the surrounding steric hindrance, satisfactory blocking resistance could not be obtained.

Accordingly the present inventors engaged in concentrated studies with the view to overcome the above defect, and have now discovered that a coating of excellent blocking resistance could be obtained by using an unsaturated monomer having a urethane linkage(s) in its main chain; and that such a monomer was advantageous also economically and could be obtained easily with stability. The present invention was thus completed.

According to the present invention, an aqueous coating composition is provided which is characterized in that it contains an aqueous solution or dispersion of a resin formed through copolymerization of a monomeric mixture composed of:

(A) an ethylenically unsaturated monomer containing at least one urethane linkage and at least two non-conjugated double bonds per molecule (hereinafter this monomer may be referred to simply as "modified unsaturated monomer") 5–98 parts by weight, (B) an ethylenically unsaturated carboxylic acid 0.5–20 parts by weight, and (C) ethylenically unsaturated monomer or monomers other than (A) and (B) 0–94.5 parts by weight, the total sum of (A), (B) and (C) components being 100 parts by weight.

The aqueous coating composition provided by the present invention exhibits markedly improved blocking resistance, and furthermore excels in such physical properties as water resistance, weatherability, alkali resistance and storage stability. The coating formed of the composition is also characterized by its excellent physical properties including solvent resistance and chemical resistance. According to the invention it is also possible to provide coating compositions forming coatings of various characteristics, by suitably selecting the polymerizable unsaturated monomer or monomers, i.e., the component (C) to be copolymerized, from a broad range of usable monomers.

Hereinafter the coating compositions to be provided by this invention will be explained in further detail.

Modified unsaturated monomer (A)

The modified unsaturated monomer (A) to be used in the present invention includes monomers containing at least one, and normally one, urethane linkage (—NH—COO—), at least two, and normally two, non-conjugated double bonds, particularly those supplied by semidrying oil fatty acid or drying oil fatty acid, and an ethylenically unsaturated bond, per molecule. As more specific typical examples, the monomers (A-I) which are obtained by reacting isocyanate-containing unsaturated monomers with hydroxyl-containing compounds having at least two non-conjugated double bonds; and the monomers (A-II) obtained by reacting hydroxyl-containing acrylic monomers with isocyanate-containing compounds each having at least two non-conjugated double bonds, may be named.

Monomers (A-I)

In the preparation of monomers (A-I) which are the reaction products of "isocyanate-containing unsaturated monomers" and "hydroxyl-containing compounds each having at least two non-conjugated double bonds", the following monomers (a) through (c) may be named as examples of one of the starting materials, "isocyanate-containing unsaturated monomers":

(a) monomers represented by the general formula (I)

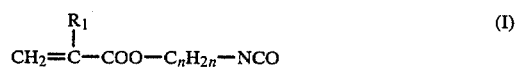

in which
R$_1$ stands for a hydrogen atom or a methyl group, and
n is an integer of 1 through 8,
for example, isocyanate-ethyl(meth)acrylate or the like.

(b) monomers represented by the general formula (II)

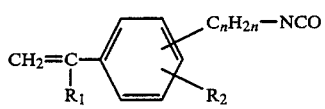 (II)

in which
R$_1$ and n are as above-defined, and
R$_2$ stands for a hydrogen atom or a C$_1$–C$_5$ alkyl group,
for example, α,α-dimethyl-m-isopropenyl-benzylisocyanate or the like.

(c) monomers obtained by reacting about one mol of a hydroxyl-containing monomer selected from hydroxyl-containing (meth)acrylic acid ester monomers represented by the general formulae (III) and (IV) below:

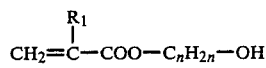 (III)

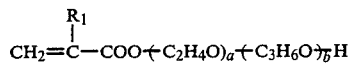 (IV)

in which
R$_1$ and n are as above-defined; and
a and b each denotes an integer of 0–8, provided a+b is 1–8;
N-methylol(meth)acrylamide and allyl alcohol; with about one mol of a diisocyanate compound. Examples of the monomers of formula (III) include: hydroxyalkyl(meth)acrylates, inter alia, 2-hydroxyethyl(meth)acrylate, 2-hydroxypropyl(meth)acrylate and the like. Examples of the monomers of above formula (IV) include

and

The diisocyanate compounds to be reacted with the above hydroxyl-containing monomers may be any of aliphatic, aromatic or alicyclic type, specific examples including toluene diisocyanate 1,6-hexamethylene diisocyanate, 4,4'-diphenylmethane diisocyanate, 4,4'-diphenylether diisocyanate, phenylenediisocyanate, naphthalenediisocyanate, diphenylenediisocyanate, 3,3'-dimethyl-4,4'-biphenylenediisocyanate, dicyclohexylmethane-4,4'-diisocyanate, p-xylenediisocyanate, m-xylenediisocyanate, bis(4-isocyanatephenyl)sulfone, isopropylidene-bis(4-phenylisocyanate), lysine diisocyanate, isophorone diisocyanate and the like. Of the above, those particularly preferred are toluene diisocyanate, 4,4'-diphenylmethane diisocyanate, isophorone diisocyanate, m-xylene diisocyanate and p-xylene diisocyanate.

As the "hydroxyl-containing compound having at least two non-conjugated double bonds" to be reacted with the above isocyanate-containing acrylic monomers (a) through (c), for example, the reaction products of unsaturated aliphatic monocarboxylic acid containing at least two non-conjugated double bonds with 1,2-epoxy compound of formula (V) below or polyhydric alcohol; or unsaturated aliphatic alcohols having non-conjugated double bonds may be named.

Above "unsaturated monocarboxylic acid containing at least two non-conjugated double bonds" are unsaturated linear or branched aliphatic monocarboxylic acids each containing at least two double bonds per molecule, the double bonds being not conjugated with each other. Suitable aliphatic monocarboxylic fatty acids are those which generally have 10 to 24 carbon atoms, preferably 14 to 20 carbon atoms, and an iodine value of at least 80, preferably at least 100. Drying oil fatty acids and semidrying oil fatty acids having at least two non-conjugated double bonds prove to be especially effective.

The drying oil fatty acids and semidrying oil fatty acids cannot be strictly defined, but generally denote monobasic acids derived from animal and vegetable oils and fats. The drying oil fatty acids generally denote unsaturated fatty acids having an iodine value of at least 130, and the semidrying oil fatty acids generally denote unsaturated fatty acids having an iodine value of 100 to 130. Typical examples of unsaturated fatty acids include safflower oil fatty acid, linseed oil fatty acid, soybean oil fatty acid, sesame oil fatty acid, poppy seed oil fatty acid, perilla oil fatty acid, hemp seed oil fatty acid, grape kernel oil fatty acid, corn oil fatty acid, tall oil fatty acid, sunflower oil fatty acid, cotton seed oil fatty acid, walnut oil fatty acid, and rubber seed oil fatty acid. These fatty acids can be used either singly or in combination with each other. Preferred fatty acids are linseed oil fatty acid, tall oil fatty acid, soybean oil fatty acid and safflower oil fatty acid.

The amount of the unsaturated fatty acid used can be varied widely depending upon the drying property or film properties required of the aqueous coating composition provided by the present invention. Generally, the advantageous amount is 3 to 65% by weight, preferably 10 to 60% by weight, based on the weight of the copolymer obtained.

In addition to the aforesaid unsaturated fatty acid containing non-conjugated double bonds, there may be used a small amount, preferably not more than 30% by weight, more preferably not more than 20% by weight, based on the total weight of the unsaturated fatty acids, of another unsaturated fatty acid containing conjugated double bonds, such as tung oil fatty acid, oiticica oil fatty acid, dehydrated castor oil fatty acid or Hy-diene fatty acid (a trademark for a conjugated fatty acid made by Soken Kagaku Co., Ltd., Japan).

Besides the above fatty acids, oil and fat thereof including those fatty acid esters can be used in the reaction with the below-specified 1,2-epoxy compounds or polyhydric alcohols.

Useful 1,2-epoxy compounds include those represented by the general formula (V)

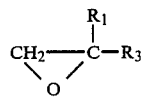 (V)

in which
R$_1$ is an already defined,
R$_3$ is a member of the group consisting of hydrogen atom, C$_1$–C$_{18}$ alkyl groups, C$_3$–C$_{12}$ cycloalkyl groups, —CH$_2$—O—R$_4$,

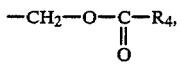

and substituted or unsubstituted phenyl groups, wherein R$_4$ stands for a member of the group consisting of hydrogen atom, C$_1$–C$_{18}$ alkyl groups, C$_3$–C$_{12}$ cycloalkyl groups, C$_2$–C$_8$ alkenyl groups, and substituted or unsubstituted phenyl groups.

In the above formula (V), R$_3$ is preferably a hydrogen atom or a C$_1$–C$_6$ alkyl group. As such 1,2-epoxy compounds, for example, ethylene oxide, propylene oxide, 1,2-butylene oxide, 1,2-pentylene oxide, 1,2-octylene oxide, styrene oxide, glycidol, glycidyl acetate, glycidyl laurate, CARDURA® E (glycidyl ester of versatic acid; commercial product of Shell Chemicals, Co.), butyl glycidyl ether, octyl glycidyl ether, phenyl glycidyl ether and p-tert.butylphenyl glycidyl ether may be named. Of those, particularly ethylene oxide, propylene oxide, 1,2-butylene oxide, glycidol, CARDURA® E, and butyl glycidyl ether are preferred.

As polyhydric alcohols, C$_2$–C$_{30}$, preferably C$_2$–C$_{14}$ aliphatic or alicyclic alcohols containing 2 to 3 hydroxyl groups per molecule are used, including, for example, ethylene glycol, polyethylene glycol, propylene glycol, polypropylene glycol, butanediol, decanediol, diethylene glycol, pentanediol, neopentyl glycol, hexanediol, glycerin, trimethylolethane, trimethylolpropane, 1,4-cyclohexanedimethanol, tricyclodecanedimethanol and tris(hydroxyethyl)isocyanurate. Of those, particularly ethylene glycol, propylene glycol, hexanediol, 1,4-cyclohexanedimethanol and neopentyl glycol are preferred.

Aforesaid reaction of unsaturated aliphatic monocarboxylic acid with 1,2-epoxy compound or polyhydric alcohol can be performed by the synthesis method known per se. For example, the reactants may be reacted in the optional presence of an inert gas for about 3 to 10 hours, generally at the temperatures of about 60°–200° C. (when 1,2-epoxy compound is used) or at about 130°–250° C. (when polyhydric alcohol is used).

As the unsaturated aliphatic alcohol having non-conjugated double bonds, for example, linseed oil alcohol, soybean oil alcohol, etc. may be named. It is permissible to use a minor amount of an unsaturated aliphatic alcohol having conjugated double bonds such as tung oil alcohol or the like, together with those unsaturated aliphatic alcohols containing non-conjugated double bonds. In that case, the amount of the former is preferably up to about 30% by weight, preferably 20% by weight, per the total weight of the unsaturated aliphatic alcohols.

Upon reacting the above-described isocyanate-containing unsaturated monomer with a "hydroxyl-containing compound having at least two non-conjugated double bonds" in the later-described manner, the monomer (A-I) can be obtained.

Examples of preferred monomers (A-I) include: reaction products obtained by reacting the isocyanate-containing unsaturated monomrs obtained through the reaction of about 1 mol of a hydroxyl-containing (meth)acrylic acid ester type monomer of the formula (III) or (IV) with about 1 mol of a diisocyanate compound, with the hydroxyl-containing compound containing at least two non-conjugated double bonds which is the reaction product of the unsaturated aliphatic monocarboxylic acid and 1,2-epoxy compound of the formula (V); and, although somewhat less in degree of preference, reaction products of the isocyanate-containing unsaturated monomers of the formula (I) in aforesaid class (a), with the hydroxyl-containing compounds each containing at least two non-conjugated double bonds.

Monomer (A-II)

The monomer (A-II) is the reaction product of a "hydroxyl-containing acrylic monomer" and an "isocyanate-containing compound having at least two non-conjugated double bonds". More specifically, the monomer (A-II) includes those obtained by reacting a hydroxyl-containing monomer selected from the group consisting of hydroxyl-containing (meth)acrylic acid ester-type monomers of the general formulae (III) and (IV), N-methylol(meth)acrylamide and allyl alcohol with an isocyanate-containing compound having at least two non-conjugated double bonds such as those specified below.

The "isocyanate-containing compound having at least two non-conjugated double bonds" includes, for example, the reaction product of aforesaid unsaturated aliphatic monocarboxylic acid with the 1,2-epoxy compound of the general formula (V) or polyhydric alcohol; and the product obtained by reacting about one mol of a hydroxyl-containing compound having at least two non-conjugated double bonds, such as an unsaturated aliphatic alcohol containing at least two non-conjugated double bonds, with about one mol of diisocyanate compound as above-described.

Preparation of modified unsaturated monomer (A)

The preparation of modified unsaturated monomer (A), i.e., monomer (A-I) or (A-II), is normally performed by reacting aforesaid "isocyanate-containing unsaturated monomer" with the "hydroxyl-containing compound having at least two non-conjugated double bonds" or the "hydroxyl-containing acrylic monomer" with "isocyanate-containing compound having at least two non-conjugated double bonds", in the optional presence of a suitable inert solvent. The reaction is normally performed under heating at about 30°–100° C., the reaction time of from about 0.5 to 6 hours being normally sufficient.

Preferably the "isocyanate-containing unsaturated monomer" and "hydroxyl-containing compound having at least two non-conjugated double bonds"; or "hydroxyl-containing acrylic monomer" and "isocyanate-containing compound having at least non-conjugated double bonds" are reacted at a molar ratio of 1.0:0.7–1.0:1.4.

The modified unsaturated monomer (A) to be employed in the present invention is not limited to aforedescribed (A-I) and (A-II), but any other modified unsaturated monomers may be used so long as they satisfy the structural requirements for the modified unsaturated monomer (A). For example, those obtained by simultaneously reacting aforesaid hydroxyl-containing acrylic monomer, hydroxyl-containing compound having at least two non-conjugated double bonds and diisocyanate, or by reacting simultaneously isocyanate-containing unsaturated monomer, isocyanate-containing compound having at least two non-conjugated double bonds and polyhydric alcohol, may be used as the modified unsaturated monomer (A).

Ethylenically unsaturated carboxylic acid (B)

The ethylenically unsaturated carboxylic acid (B) to be used in this invention includes unsaturated aliphatic mono- or poly-carboxylic acid having addition-polymerizable double bonds between the carbon atom to which the carboxyl group is bonded and the carbon atom adjacent thereto. Those containing 3 to 8 carbon atoms, particularly 3 to 5 carbon atoms, and 1 or 2 carboxyl groups are particularly suited, including as the typical examples those of the following general formula (VI)

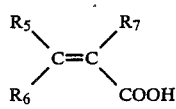

wherein
$R_5$ represents a hydrogen atom or a lower alkyl group,
$R_6$ represents a hydrogen atom, a lower alkyl group or a carboxyl group,
and $R_7$ represents a hydrogen atom, a lower alkyl group or a carboxy-lower alkyl group,
and those of the general formula (VIII)

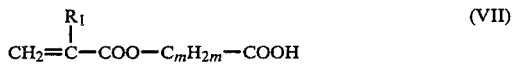

wherein m is an integer of 2-6, and $R_1$ has the already defined significance.

In the above formula (VI), as the lower alkyl groups those containing not more than 4 carbon atoms are preferred, methyl group being the most preferred.

Specific examples of such ethylenically unsaturated carboxylic acid include acrylic acid, methacrylic acid, crotonic acid, itaconic acid, maleic acid, maleic anhydride, fumaric acid, 2-carboxyethyl(meth)acrylate, 2-carboxypropyl(meth)acrylate, and the like. They can be used either individually or in combination of more than one, acrylic acid, methacrylic acid, and 2-carboxyethyl(meth)acrylate being particularly preferred.

Other ethylenically unsaturated monomer (C)

The ethylenically unsaturated monomers (C) other than above (A) and (B) are not particularly limited, but one or more of $\alpha,\beta$-ethylenically unsaturated monomers can be suitably selected from a variety of such monomers in a broad range according to the desired performance of the aqueous coating composition of the present invention. Particularly those having the Q value in Q-e theory of generally at least 0.1, preferably 0.1–5 are suitable.

The "Q-e theory", as used in the present specification and appended claims, is a theory of the constant of the velocity of addition reaction of a monomer with a radical, which was advocated by T. Alfrey and C. Price in 1947 in order to deal with the radical polymerization or copolymerization of vinyl compounds systematically [see J. Polymer Sci., 2, 101 (1947)]. It expresses the reactivity ratio of monomers in radical polymerization or copolymerization as the function of the resonance stability of the radical and the polar effect of the monomers. The "Q value" represents the degree of the resonance stability, and the "e value" is a measure of a relative charge on the double bond. Generally, styrene is taken as a standard, and is supposed to have a Q value of 1.00 and an e value of −0.80. From the results of copolymerization, the Q and e values of other monomers are determined.

Typical examples of such unsaturated monomers include the following:

(a) Acrylic or methacrylic acid esters $C_1$–$C_{18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; glycidyl acrylate and glycidyl methacrylate; $C_2$–$C_8$ alkenyl esters of acrylic or methacrylic acid such as allyl acrylate and allyl methacrylate; $C_2$–$C_8$ hydroxyalkyl esters of acrylic or methacrylic acid, such as hydroxyethyl acrylate, hydroxyethyl methacrylate, hydroxypropyl acrylate ane hydroxypropyl methacrylate; and $C_3$–$C_{18}$ alkenyloxyalkyl esters of acrylic or methacrylic acid, such as allyloxyethyl acrylate and allyloxyethyl methacrylate.

(b) Vinyl aromatic compounds

Styrene, α-methylstyrene, vinyltoluene, and p-chlorostyrene.

(c) Polyolefin compounds

Butadiene, isoprene and chloroprene. and

(d) Other unsaturated monomers

Acrylonitrile, methacrylonitrile, methyl isopropenyl ketone.

Those unsaturated monomers can be suitably selected according to the intended properties of the product, either singly or in combination of two or more.

Of those unsaturated monomers, $C_1$–$C_{18}$ alkyl esters of acrylic and methacrylic acid, and vinyl aromatic compounds are preferred.

Also as the unsaturated monomers other than the above (a) through (d), one or more of nitrogen-containing unsaturated monomers such as N-butoxymethyl(meth)acrylamide, N-methylol(meth)acrylamide, vinylpyridine and the like; and phoshorus-containing unsaturated monomers such as dimethyl phosphate-ethyl acrylate, (meth)acryloxyethyl phosphate, and the like may be used, in an amount of up to about 30 parts by weight per 100 parts by weight of the finally formed copolymer, for improving hardenability, water resistance and adhering ability.

Copolymerization

According to the present invention, the abovedescribed modified unsaturated monomer (A), ethylenically unsaturated carboxylic acid (B) and unsaturated monomer (C) are mutually copolymerized. The copolymerization can be performed by a method known per se for making acrylic copolymers, for example, solution polymerization, emulsion polymerization, suspension polymerization and the like.

The blend ratio of above three components is effecting the copolymerization is variable depending on the desired performance of the aqueous coating composition, but normally blending within the below-specified ratio is suitable, provided that the sum of the three components is 100 parts by weight.

Modified unsaturated monomer (A): 5–98 parts by weight, preferably 10–85 parts by weight for better performance of the coating film, inter alia, 15–80 parts by weight.

Ethylenically unsaturated carboxylic acid (B): 0.5–20 parts by weight, for better water-solubility and coating performance, 1–18 parts by weight, inter alia, 2–15 parts by weight.

Ethylenically unsaturated monomer (C) other than (A) and (B): 0–94.5 parts by weight, for preferred coating performance, 5–83 parts by weight, inter alia, 7–80 parts by weight.

The above copolymerization reaction is preferably performed by solution polymerization method with advantage. That is, above three components in a suitable inert solvent can be reacted in the presence of a polymerization catalyst for about 1 to about 20 hours, preferably from about 6 to about 10 hours, normally at about 0 to about 180° C., preferably at about 40 to about 170° C.

As the useful solvent, those which can dissolve the formed copolymer and which also are miscible with water are preferred, so as to prevent gellation from occurring during the copolymerization reaction. Particularly those which need not be removed from the reaction system in the course of preparing aqueous pigment dispersion but can be used as left therein are preferred. Examples of such solvents include cellosolve-type solvents represented by the formula

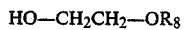

$R_8$ standing for hydrgen atom or any of $C_1$–$C_8$ alkyl groups, e.g., ethylene glycol, butyl cellosolve, ethyl cellosolve and the like; propylene glycol type solvents represented by the formula

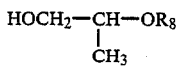

wherein $R_8$ has the above-defined significance, e.g., propylene glycol monomethyl ether and the like; carbitol-type solvents of the formula

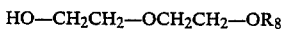

wherein $R_8$ has the above-defined significance, e.g., diethylene glycol, methyl carbitol, butyl carbitol and the like; glyme-type solvents represented by the formula

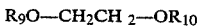

$R_9$ and $R_{10}$ each standing for any of $C_1$–$C_3$ alkyl groups, e.g., ethylene glycol dimethyl ether and the like; diglyme-type solvents represented by the formula

$R_9$ and $R_{10}$ having the above-defined significance, e.g., diethylene glycol dimethyl ether and the like; cellosolve acetate-type solvents of the formula

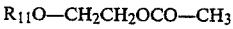

$R_{11}$ standing for hydrogen atom, $CH_3$ or $C_2H_5$, e.g., ethylene glycol monoacetate, methyl cellosolve acetate and the like; alcoholic solvents of the formula

$R_{12}$ standing for any of $C_1$–$C_4$ alkyl groups, e.g., ethanol, propanol and the like; and diacetone alcohol, dioxane, tetrahydrofuran, acetone, dimethylformamide, 3-methoxy-3-methyl-butanol and the like.

Water-immiscible inert solvents also are usable. As such solvents, those boiling at 250° C. or below are preferred, so that they may be easily removed after the copolymerization reaction by normal pressure- or reduced pressure-distillation. Examples of such solvents include aromatic hydrocarbons of the formula

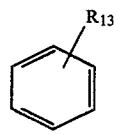

wherein $R_{13}$ represents a hydrogen atom or a $C_1$–$C_4$ alkyl group, or

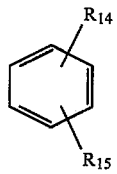

wherein $R_{14}$ and $R_{15}$ each represents a $C_1$–$C_4$ alkyl group, such as toluene and xylene; acids or esters of the formula

in which $R_{16}$ represents a $C_1$–$C_6$ alkyl group, and
$R_{17}$ represents a hydrogen atom, a $C_1$–$C_6$ alkyl group, or cyclohexyl group such as acetic acid, ethyl formate, butyl acetate and cyclohexyl acetate; ketones of the formula

in which $R_{18}$ and $R_{19}$ each represents a $C_1$–$C_8$ alkyl group, and by the formula

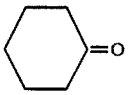

such as methyl ethyl ketone and cyclohexanone; ethers of the formula

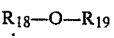

wherein $R_{18}$ and $R_{19}$ have the above-defined significance such as ethyl ether and hexyl ether; and alcohols of the formula

wherein $R_{20}$ represents a $C_5$–$C_{11}$ alkyl group such as hexanol.

The solvent can be used in an amount of 15 to 90% by weight based on the total weight of the three monomeric components to be copolymerized.

The polymerization catalyst may be any of radical initiators which can be used in usual radical polymerization, for example azo compounds, peroxide compounds, sulfides, sulfines, sulfinic acids, diazo compounds, nitroso compounds, redox systems and ionizing radiation.

The copolymer formed by the above copolymerization can have a number average molecular weight normally ranging from about 500 to 1,000,000, and for better coating performance, from about 1,000 to 50,000.

It is advantageous that the copolymer has an acid value normally within the range of 4 to 200 KOH mg/g, preferably 15–150 KOH mg/g.

Aqueous coating composition

The resulting copolymer is rendered water-soluble or water-dispersible as such or after removing the solvent. This can be achieved in a customary manner by neutralizing the carboxyl groups present in the copolymer with a known neutralizing agent. Useful neutralizing agents include organic or inorganic bases such as ammonia, amines, alkali metal hydroxides, alkali metal carbonates, and alkali metal bicarbonates. Examples of the amines are primary, secondary or tertiary alkylamines, primary, secondary or tertiary alkanolamines, and cycloalkylamines. Examples of the alkali metal hydroxides are potassium hydroxide and sodium hydroxide. Examples of the alkali metal carbonates or bicarbonates are potassium carbonate, sodium carbonate and sodium bicarbonate.

The neutralization treatment can be easily performed in a customary manner by adding the neutralizing agent or its aqueous solution to the resulting copolymer or its solution. The amount of the neutralizing agent used is generally 0.1 to 2.0 equivalents, preferably 0.3 to 1.0 equivalent, based on the carboxyl groups in the copolymer.

Thus formulated aqueous coating composition of this invention can contain the resin normally at a solid concentration ranging from 5–70% by weight, preferably from 10–50% by weight.

If required, the aqueous coating composition according to this invention may additionally contain one or more of such additives as extender pigment, e.g., talc, calcium carbonate, mica, clay and siliceous sand; coloring pigment; e.g., titanium dioxide, carbon black, red iron oxide, chrome yellow, Cyanine Blue, Cinqusia Red, Quinacridone Red, Fast Red, Cyanine Green and Chrome Green; dryer such as cobalt naphthenate, lead naphthenate and manganese naphthenate; rustproofing agent, e.g., barium phytate, barium cyanurate, calcium plumbate and lead cyanamide; ultraviolet absorber, e.g., 2,2'-dihydroxy-4-methoxybenzophenone and 2,4'-dihydroxybenzophenone; surface active agent, e.g., sodium alkylnaphthalene sulfonate, polyoxyethylene alkylether, sodium alkylbenzenesulfonate and alkylphenol polyethylene ether; and antiseptics. Addition of dryers can greatly improve the drying property of the coating film prepared from the aqueous coating composition.

The aqueous coating composition of this invention described hereinabove has excellent blocking resistance and superior storage stability over a long period of time, and coating films obtained therefrom are fast-drying and have superior water resistance, weatherability, corrosion resistance, alkali resistance, mechanical strength, salt water resistance, solvent resistance, chemical resistance and gloss.

If required, the aqueous coating composition of this invention may be diluted with water. The films formed from the coating composition fully cure at room temperature. If desired, the curing may be effected at an elevated temperature.

Since the aqueous coating composition of this invention cures sufficiently at ordinary temperature, it can be used as versatile paints for coating furniture, buildings, etc. It is also useful as an industrial paint in coating machinery because it also cures at an elevated temperature.

The following Examples illustrate the present invention more specifically. All parts and percentages in these Examples are by weight unless otherwise specified.

PRODUCTION EXAMPLE OF MODIFIED UNSATURATED MONOMER (A)

(1) Preparation of a modified unsaturated monomer (A-1)

A reactor was charged with 278 parts of 2-hydroxyethyl methacrylate, 208 parts of toluene diisocyanate and 0.01 part of hydroquinone. The system was reacted for 3.5 hours at 60° C. to form an isocyanate-containing unsaturated monomer.

Separately, a reactor was charged with 230 parts of 1,2-butylene oxide, 840 parts of safflower oil fatty acid, 4.2 parts of tetraethylammonium bromide and 4.2 parts of methanol. The system was reacted for 3 hours at 150° C. to form a fatty acid-modified product containing a secondary hydroxyl group.

Then 528 parts of the modified product containing a secondary hydroxyl group and 456 parts of the isocyanate-containing unsaturated monomer were reacted for 4 hours at 60° C. The reaction system was then cooled at 20° C. and added with n-butyl cellosolve, to provide a solution of modified unsaturated monomer (A-1) having Gardner viscosity of R at the solid content of 75% (measured with 60% n-butyl cellosolve solution, like the viscosity measurement effected in all of the following Examples).

(2) Preparation of a modified unsaturated monomer (A-2)

A reactor was charged with 260 parts of n-butylglycidyl ether, 560 parts of safflower oil fatty acid, 3.4 parts of tetramethylammonium bromide and 3.4 parts of methanol, and the system was reacted for an hour at 165° C. to provide a fatty acid-modified product containing a secondary hydroxyl group.

Then 410 parts of this modified product containing a secondary hydroxyl group was reacted with 304 parts of the same isocyanate-containing unsaturated monomer as that used in the preparation of aforesaid modified unsaturated monomer (A-1) for 2 hours at 70° C. The system was then cooled to 20° C., and added with n-butyl cellosolve to provide a solution of modified unsaturated monomer (A-2) having Gardner viscosity of E at the solid content of 75%.

(3) Preparation of a modified unsaturated monomer (A-3)

A reactor was charged with 155 parts of isocyanate ethyl methacrylate (product of DOW Chemicals, Co.) and 410 parts of the same fatty acid-modified product containing a secondary hydroxyl group as that used in the preparation of aforesaid modified unsaturated monomer (A-2), and the system was reacted for 2 hours at 70° C. The system was then cooled to 20° C., and added with n-butyl cellosolve to provide a modified unsaturated monomer (A-3) solution having Gardner viscosity of A at the solid content of 75%.

(4) Preparation of a modified unsaturated monomer (A-4)

In a reactor 253 parts of 2,2-dimethyl-m-isopropenyl-benzyl diisocyanate (product of American Cyanamid Co.) was reacted with 352 parts of the same fatty acid-modified product containing a secondary hydroxyl group as that used in the preparation of aforesaid modified unsaturated monomer (A-1) for 1.5 hours at 75° C. Then the system was cooled to 20° C. and added with n-butyl cellosolve to provide a modified unsaturated monomer (A-4) having Gardner viscosity of C at the solid content of 75%.

PRODUCTION EXAMPLES OF COPOLYMERS FOR AQUEOUS COATING COMPOSITION (i) THROUGH (iv)

Six hundred (600) parts of n-butyl cellosolve was put in a reactor and heated to 120° C., into which mixtures of below-specified compositions were added dropwise separately over about 2 hours. The reaction was performed under injection of nitrogen.

A mixture composed of

| | |
|---|---|
| modified unsaturated monomer (A-1) solution (solid content = 75%) | 290 parts |
| styrene | 220 parts |
| n-butyl methacrylate | 225 parts |
| acrylic acid | 58 parts |
| and a mixture composed of azobisdimethylvaleronitrile | 18 parts |
| n-butyl cellosolve | 180 parts | were separately and added dropwise to the reaction system while maintaining the reaction temperature at 120° C. under stirring. One hour after completion of the dropwise addition, 3.6 parts of azobisisobutyronitrile was added to the reaction solution, and after further 2 hours again 3.6 parts of azobisisobutyronitrile was added. The reaction was continued for subsequent 2 hours, still maintaining the reaction temperature at 120° C. Thereafter unreacted monomers and n-butyl cellosolve were removed by reduced pressure-distillation, to provide a copolymer solution (i) with a heated residue content of 75.1%, acid value of the resin of 57.5 and Gardner viscosity of $Z_2$.

Copolymer solutions (ii) through (iv) were prepared in the manner similar to the preparation of copolymer (i) for aqueous coating, using the starting materials as specified in Table 1.

EXAMPLES 1–4

The above-obtained copolymers (i) through (iv) for aqueous coating were neutralized with triethylamine in amounts approximately equivalent to the carboxyl groups in said copolymers. Then 0.5 part (as converted to the metal per 100 parts of the resin solid) of cobalt naphthenate and 0.5 part (as converted to the metal per 100 parts of the resin solid) of lead naphthenate were added thereto, followed by further addition of water, and each system was homogeneously mixed to provide aqueous coating compositions (solid content=22%) of Examples 1–4.

COMPARATIVE EXAMPLE

A reactor was charged with 942 parts of safflower oil fatty acid, 477 parts of glycidyl methacrylate, 1.2 parts of hydroquinone, 1 part of tetraethylammonium bromide and 1 part of methanol. The system was reacted for 6 hours at 160° C. The reaction solution was once cooled to 20° C., and 392 parts of phenyl isocyanate was added thereto, followed by an hour's reaction at 90° C. Upon subsequent cooling, a fatty acid-modified monomer (A-5) having Gardner viscosity of $Z_2$ was obtained. This was used in the composition as specified in Table 1 to provide a copolymer solution (v) with a solid content of 75% through the same method as that employed for the preparation of copolymer (i) for aqueous coating. This copolymer solution (v) was used for the preparation of an aqueous coating composition, under the identical conditions with those described in Example 1.

TABLE 1

| | Copolymer | | | | |
|---|---|---|---|---|---|
| | (i) | (ii) | (iii) | (iv) | (v) |
| Modified unsaturated monomer (A) | | | | | |
| (A-1) | 290 | — | — | — | — |
| (A-2) | — | 350 | — | — | — |
| (A-3) | — | — | 400 | — | — |
| (A-4) | — | — | — | 350 | — |
| Monomer | | | | | |
| (A-5) | | | | | 350 |
| n-Butyl cellosolve | 600 | 500 | 500 | 500 | 600 |
| Azobisdimethyl-valeronitrile | 18 (180*) | 20 (200*) | 19 (200*) | 23 (200*) | 20 (200*) |
| Unsaturated acid (B) | | | | | |
| Acrylic acid | 58 | 65 | 60 | 50 | 70 |
| Unsaturated monomer (C) | | | | | |
| Styrene | 220 | 200 | 50 | 150 | 250 |
| n-Butyl methacrylate | 225 | — | 50 | — | 250 |
| 2-Ethylhexyl acrylate | — | 100 | 100 | 200 | — |
| Methyl methacrylate | — | — | 100 | 50 | — |
| Azobisisobutyronitrile | 3.6/3.6 | 3.5/3.5 | 3.5/3.5 | 3.5/3.5 | 4.0/4.0 |
| Acid value of resin | 57.5 | 70.6 | 62.0 | 52.5 | 60.3 |
| Viscosity | $Z_2$ | $Z_2$ | $Z_1$ | $Z_1$ | $Z_2$ |
| Resin concentration | 75.1% | 74.9% | 75.0% | 74.8% | 75.0% |

*These amounts are n-butyl cellosolve used for dissolving azobisdimethylvaleronitrile.

Coating performance test

Each of the aqueous coating compositions prepared in Examples 1 through 4 and Comparative Example was applied on a soft steel sheet to a dry film thickness of 30–40 microns with a bar coater, dried for 20 minutes at 80° C., and allowed to stand for subsequent 5 hours. The coatings were then tested for their water resistance, hardness and blocking resistance. The water resistance was evaluated by immersing the coated steel sheet in 20° C. tap water for a day and examining the state of coated surface and adherability of the coating. The hardness of the coating was expressed by pencil hardness. The blocking resistance was evaluated by spreading a sheet of gauze on the coated sheet, leaving a 500 g weight thereon for a day at 20° C., and observing the traces of gauze pattern left on the coated surface. The results were as shown in Table 2 below.

TABLE 2

|  | Hardness | Water resistance | Blocking resistance |
| --- | --- | --- | --- |
| Example 1 | H | normal | normal |
| Example 2 | H | " | " |
| Example 3 | H | " | " |
| Example 4 | H | " | " |
| Comparative Example | B | " | Traces of pattern left on the coated surface |

What we claim is:

1. An aqueous coating composition which contains an aqueous solution or dispersion of a copolymer of
 (A) 5–98 parts by weight of an ethylenically unsaturated monomer containing at least one urethane linkage and at least two non-conjugated double bonds per molecule, which is a reaction product of an isocyanate-containing unsaturated monomer and a hydroxyl-containing compound having at least two non-conjugated double bonds, in which the isocyanate-containing unsaturated monomer is selected from the group consisting of (a) monomers of the formula (I)

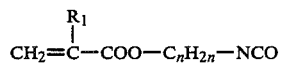

in which
 $R_1$ stands for a hydrogen atom or a methyl group, and n is an integer of 1 through 8, (b) monomers of the formula (II)

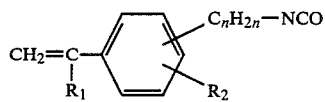

in which
 $R_1$ and n are as above-defined, and $R_2$ stands for a hydrogen atom or a $C_1$–$C_5$ alkyl group, and (c) monomers obtained by reacting about 1 mol of a hydroxyl-containing monomer selected from hydroxyl-containing (meth)acrylic acid ester monomers of the formulae (III) and (IV)

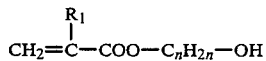

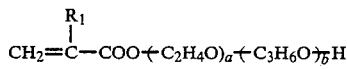

in which
 $R_1$ and n are as above-defined, and a and b each denotes an integer of 0–8, provided a+b is 1–8, N-methylol(meth)acrylamide and allyl alcohol, with about 1 mol of a diisocyanate compound,
 (B) 0.5–20 parts by weight of an ethylenically unsaturated carboxylic acid, and
 (C) 0–94.5 parts by weight of an ethylenically unsaturated monomer or monomers other than those in said (A) and (B),
 the total sum of said (A), (B) and (C) components being 100 parts by weight, said copolymer having a number average molecular weight of from about 500 to 1,000,000.

2. The composition of claim 1, in which the diisocyanate compound is selected from the group consisting of toluene diisocyanate, 4,4'-diphenylmethane diisocyanate, isophorone diisocyanate, m-xylene diisocyanate and p-xylene diisocyanate.

3. The composition of claim 1, in which the hydroxyl-containing compound having at least two non-conjugated double bonds is a reaction product of an unsaturated aliphatic monocarboxylic acid having at least two non-conjugated double bonds with a 1,2-epoxy compound or a polyhydric alcohol.

4. The composition of claim 3, in which the unsaturated aliphatic monocarboxylic acid having at least two non-conjugated double bonds is selected from the group consisting of drying oil fatty acids and semidrying oil fatty acids.

5. The composition of claim 3, in which the polyhydric alcohol is selected from $C_2$–$C_{30}$ aliphatic and alicyclic alcohols containing 2–3 hydroxyl groups per molecule.

6. The composition of claim 3, in which the 1,2-epoxy compound is a compound of the formula (V)

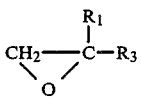

in which
 $R_1$ stands for a hydrogen atom or a methyl group,
 $R_3$ is a member of the group consisting of a hydrogen atom, a $C_1$–$C_{18}$ alkyl group, a $C_3$–$C_{12}$ cycloalkyl group, —$CH_2$—O—$R_4$,

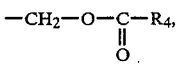

phenyl and p-tert-butylphenyl, wherein $R_4$ stands for a hydrogen atom, a $C_1$–$C_{18}$ alkyl group, a $C_3$–$C_{12}$ cycloalkyl group, a $C_2$–$C_8$ alkenyl group, phenyl or p-tert-butylphenyl.

7. The composition of claim 1, in which the unsaturated monomer (A) is a product obtained by reacting the isocyanate-containing unsaturated monomer obtained through the reaction of about 1 mol of a hydroxyl-containing (meth)acrylic acid ester monomer of the formula (III) or (IV) with about 1 mol of a diisocyanate compound, with the hydroxyl-containing compound containing at least two non-conjugated double bonds which is the reaction product of the unsaturated aliphatic monocarboxylic acid and a 1,2-epoxy compound of the formula (V).

8. The composition of claim 1, in which the ethylenically unsaturated carboxylic acid (B) is selected from those represented by the formula (VI)

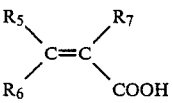

in which
 $R_5$ stands for a hydrogen atom or a lower alkyl group,

R$_6$ stands for a hydrogen atom, a lower alkyl group or a carboxyl group, and

R$_7$ stands for a hydrogen atom, a lower alkyl group or a carboxy-lower alkyl group, and those of the general formula (VII)

$$CH_2=\underset{\underset{R_1}{|}}{C}-COO-C_mH_{2m}-COOH \qquad (VII)$$

in which

R$_1$ stands for a hydrogen atom or a methyl group, and m is an integer of 2 to 6.

9. The composition of claim 1, in which the ethylenically unsaturated carboxylic acid (B) is selected from the group consisting of acrylic acid, methacrylic acid, 2-carboxyethyl acrylate and 2-carboxyethyl methacrylate.

10. The composition of claim 1, in which the ethylenically unsaturated monomer (C) has a Q value in the Q-e theory of at least 0.1.

11. The composition of claim 1, in which the ethylenically unsaturated monomer or monomers (C) is or are selected from C$_1$–C$_{18}$ alkyl esters of acrylic and methacrylic acids and vinyl aromatic compounds.

12. The composition of claim 1, in which the amount of the unsaturated monomer (A) ranges from 10 to 85 parts by weight.

13. The composition of claim 1, in which the amount of the unsaturated carboxylic acid (B) ranges from 1 to 18 parts by weight.

14. The composition of claim 1, in which the resin has an acid value of 4 to 200.

15. The composition of claim 1, in which the resin is rendered water-soluble or water-dispersible by neutralization with an organic or inorganic base.

16. The composition of claim 1 which further comprises at least one additive selected from the group consisting of extender pigments, coloring pigments, dryers, rustproofing agents, ultraviolet absorbers, surface-active agents and antiseptics.

17. An article coated with an aqueous coating composition of claim 1.

18. An aqueous coating composition which contains an aqueous solution or dispersion of a copolymer of
(A) 5–98 parts by weight of an ethylenically unsaturated monomer containing at least one urethane linkage and at least two non-conjugated double bonds per molecule, which is a reaction product of a hydroxyl-containing acrylic monomer and an isocyanate-containing compound having at least two non-conjugated double bonds,
(B) 0.5–20 parts by weight of an ethylenically unsaturated carboxylic acid, and
(C) 0–94.5 parts by weight of an ethylenically unsaturated monomer or monomers other than those in said (A) and (B),
the total sum of said (A), (B) and (C) components being 100 parts by weight, said copolymer having a number average molecular weight of from about 500 to 1,000,000.

19. The composition of claim 18, in which the hydroxyl-containing acrylic monomer is selected from the hydroxyl-containing (meth)acrylic acid ester monomers of the formulae (III) and (IV)

$$CH_2=\underset{\underset{R_1}{|}}{C}-COO-C_nH_{2n}-OH \qquad (III)$$

$$CH_2=\underset{\underset{R_1}{|}}{C}-COO(C_2H_4O)_a(C_3H_6O)_bH \qquad (IV)$$

in which

R$_1$ stands for a hydrogen atom or a methyl group, n is an integer of 1–8, a and b are each an integer of 0–8, provided a+b is 1–8, N-methylol(meth)acrylamide and allyl alcohol.

20. The composition of claim 18, in which the isocyanate-containing compound having at least two non-conjugated double bonds is a product obtained by reacting about 1 mol of a hydroxyl-containing compound containing at least two non-conjugated double bonds which is a reaction product of an unsaturated aliphatic monocarboxylic acid having at least two non-conjugated double bonds, with a 1,2-epoxy compound or a polyhydric alcohol, with about 1 mol of a diisocyanate compound.

21. The composition of claim 20, in which the unsaturated aliphatic monocarboxylic acid having at least two non-conjugated double bonds is selected from drying oil fatty acids and semidrying oil fatty acids.

22. The composition of claim 20, in which the polyhydric alcohol is selected from C$_2$–C$_{30}$ aliphatic and alicyclic alcohols containing 2–3 hydroxyl groups per molecule.

23. The composition of claim 20, in which the diisocyanate compound is selected from the group consisting of toluene diisocyanate, 4,4'-diphenylmethane diisocyanate, isophorone diisocyanate, m-xylene diisocyanate and p-xylene diisocyanate.

24. The composition of claim 20, in which the 1,2-epoxy compound is a compound of the formula (V)

$$CH_2-\underset{\underset{R_1}{|}}{\overset{}{C}}-R_3 \qquad (V)$$
$$\diagdown O \diagup$$

in which

R$_1$ stands for a hydrogen atom or a methyl group,

R$_3$ is a member of the group consisting of a hydrogen atom, a C$_1$–C$_{18}$ alkyl group, a C$_3$–C$_{12}$ cycloalkyl group, —CH$_2$—O—R$_4$, $$-CH_2-O-\underset{\underset{O}{\overset{\|}{}}}{C}-R_4,$$

phenyl and p-tert-butylphenyl, wherein R$_4$ stands for a hydrogen atom, a C$_1$–C$_{18}$ alkyl group, a C$_3$–C$_{12}$ cycloalkyl group, a C$_2$–C$_8$ alkenyl group, phenyl or p-tert-butylphenyl.

25. An article coated with an aqueous coating composition of claim 18.

* * * * *